US006792715B2

(12) United States Patent
Smidstrup Damgaard Pedersen et al.

(10) Patent No.: US 6,792,715 B2
(45) Date of Patent: Sep. 21, 2004

(54) METHODS AND CUTTINGS FOR MASS PROPAGATION OF PLANT PARASITES (75) Inventors: Jørgen Smidstrup Damgaard Pedersen, Stenstrup (DK); Bo I. Jørgensen, Holbæk (DK)

(73) Assignee: University of Copenhagen, Copenhagen (DK)

( * ) Notice: Subject to any disclaimer, the term of this patent is extended or adjusted under 35 U.S.C. 154(b) by 0 days.

(21) Appl. No.: 10/190,602

(22) Filed: Jul. 9, 2002

(65) Prior Publication Data

US 2003/0029078 A1 Feb. 13, 2003

(30) Foreign Application Priority Data

Jul. 9, 2001 (DK) ......................................... 2001 01078

(51) Int. Cl.⁷ .............................................. A01G 1/00
(52) U.S. Cl. ....................................................... 47/58.1
(58) Field of Search .......................................... 47/58.1

(56) References Cited

U.S. PATENT DOCUMENTS

| | | | |
|---|---|---|---|
| 5,547,674 A | 8/1996 | Khwaja | 424/195.1 |
| 5,565,200 A | 10/1996 | Khwaja | 424/195.1 |
| 5,738,850 A | 4/1998 | Hendricks et al. | 424/195.1 |
| 5,780,037 A | 7/1998 | Khwaja | 424/195.1 |
| 5,846,548 A | 12/1998 | Bartos | 424/278.1 |
| 6,106,867 A | 8/2000 | Mishima et al. | 424/539 |
| 6,306,453 B1 | 10/2001 | Kürzinger | 426/658 |
| 6,379,714 B1 | 4/2002 | Khwaja et al. | 424/725 |

FOREIGN PATENT DOCUMENTS

| | | |
|---|---|---|
| CA | 2021862 | 1/1992 |
| DE | 41 05 173 | 8/1992 |
| DE | 195 33 792 | 3/1997 |
| WO | 87/05218 | 9/1987 |
| WO | 96/00239 | 1/1996 |
| WO | 96/32121 | 10/1996 |
| WO | 96/32122 | 10/1996 |
| WO | 96/32123 | 10/1996 |
| WO | 97/01636 | 1/1997 |
| WO | 97/11967 | 4/1997 |
| WO | 97/24136 | 7/1997 |
| WO | 98/13053 | 4/1998 |
| WO | 98/29540 | 7/1998 |
| WO | 99/40109 | 8/1999 |
| WO | 00/59464 | 10/2000 |
| WO | 01/60389 | 8/2001 |
| WO | 02/40041 | 5/2002 |

OTHER PUBLICATIONS

Armstrong; Vegetative Propagation of the Western Australian Christmas Tree, *Nuytsia Floriibunda*; Combined Proceedings—Int. Plant Propagator's Society; (1990) vol. 40, pp. 64–68.

(List continued on next page.)

*Primary Examiner*—Bruce R. Campell
*Assistant Examiner*—Louanne Krawczewicz Myers
(74) *Attorney, Agent, or Firm*—Jacobson and Holman PLLC (57) ABSTRACT

The invention relates to the field of plant propagation and more specifically to the mass propagation of plants with plant parasites, preferably of plants with green plant parasites, so called hemi-parasites. Accordingly there is provided a method for preparation of a plant comprising in successive order establishing at least one plant parasite on at least one branch of a host plant, cutting at least one branch with at least one established plant parasite, and rooting the at least one cut branch.

28 Claims, 5 Drawing Sheets

OTHER PUBLICATIONS

Smith; Propagation of Quandongs; Combined Proceedings—Int. Plant Propagator's Society; (1994) vol. 44, pp. 108–109.

Showler; Raising Mistletoe (*Viscum Album*)From Seed; Journal of the Royal Horticultural Society; (1974), vol. 99, No. 1, pp. 30–37.

Vrugtman; Propagation of European Mistletoe; Plant Propagator; (1972), vol. 18, No. 4, pp. 3–4.

Obee et al.; Propagation and Reintroduction of the Endangered Hemiparasite *Schwalbea Americana* (Scrophulariaceae) ; Rhodara, Spring 1997, vol. 99, No. 898, pp. 134–147.

Roth et al. ; Response of Dwarf Mistletoe–Infested Ponderosa Pine to Thinning: 2, Dwarf Mistletoe Propagation; USDA Forest Service research paper PNW–USA, Pacific Northwest Forest and Range Experiment Station, Jan. 1985, No. 331, 23 pgs.

Deeks et al.; Tissue Culture of Parasitic Flowering Plants: Methods and Applications in Agriculture and Forestry; In Vitro Cellular & Development Biology—Plant, (1999), vol. 35, No. 5, pp. 369–381.

Xiao et al. ; The Propagation of Loranthaceae from Xishuangbanna; Acta Botanica Yunnanica; (1989) vol. 11, No. 2, only abstract available.

METHODS AND CUTTINGS FOR MASS PROPAGATION OF PLANT PARASITES

TECHNICAL FIELD

The invention relates to the field of plant propagation and more specifically to the mass propagation of plants with plant parasites, preferably of plants with green plant parasites, so called hemi-parasites.

This application claims the priority of Danish patent application no. PA 2001 01078 filed on Jul. 9, 2001, which is hereby incorporated by reference in its entirety. All patent and non-patent references cited in that application, or in the present application, are also hereby incorporated by reference in their entirety.

BACKGROUND

Plants with plant parasites are grown for a variety of purposes. Some plant parasites such as mistletoes contain active ingredients that are used as pharmaceutical preparations for treating a number of diseases including cancer and AIDS.

Mistletoe may also be used for producing medicaments for the treatment of diseases of the small intestine (disorders caused by medicaments or infections), of bone marrow (aplasia and insufficiency, for instance as a result of agranulositosis caused by medicaments or radiation), of the thymus (dysfunction, aplasia or hypoplasia), the spleen (dysfunction), lymph nodes (aplasia or hypoplasia resulting from disorders caused by medicaments or radiation), for adjuvant treatment—also combined with chemopharmaceuticals—of analgesia, of liver, pancreas and kidney disorders as well as malign tumors, specially of breast, cervical, colon or prostate carcinoma. Viscum dry extracts can also be used to stimulate cellular immunity, to treat leucocytopenia, granulocytopenia, lymphocytopenia, erythrocytopenia as well as immunoglobulin deficiencies as a result of cancer, disorders characterized by a deficiency of the immune system, specially AIDS, in addition to bacterial and viral induced symptoms such as inflammatory disorders of the small intestine, the pancreas and the kidneys, hepatitis A, B and C, skin lesions (ulcus cruis), herpes simplex I and II as well as herpes zoster, and also to treat hyperlipoproteinemia with high levels of cholesterol, LDL cholesterol, triglycerides and low levels of HDL cholesterol (WO 98/13053).

Plants with parasites, especially hemi-parasites, are also grown for ornamental purposes and are used as pot plants, bonzais or ornamental garden plants. Due to high production costs this market has been very limited up till now. However, world wide there is an increased demand for unusual plants, not just for plant collectors but also for ordinary consumers of pot plants. Mistletoes are traditionally associated with Christmas in a number of countries, and it is believed that price is the primary obstacle against pot plants with mistletoes becoming a major sales success during the Christmas season. A significant market for mistletoes is the sale as cut-green or cut-greens. Branches for this purpose are normally cut in nature in areas of massive mistletoe infections.

The commercial production of pot plants and ornamental garden plants is very limited due to high costs associated with the steps required to produce a plant with an established plant parasite. Traditionally, production is done in a two step process. In the first step the mother plant is propagated by any known means such as germination of seeds, by cuttings, by grafting or through in vitro culture and subsequently grown to a certain size. In the second step, the plant parasite is established on the host plant, and after successful establishment the plant is cultured until the plant parasite has reached an acceptable size. The period from sowing the seed on the host plant until the plant is ready for sale may well take two to three years or more. For a plant that is to be sold in a temperate climate zone, this production is normally carried out in greenhouses, since most pot plants are of tropic or sub-tropic origin. Due to the requirement for greenhouse facilities and the length of the production period, the prize of such a product is prohibitively high for the average consumer.

Growing the plants with the plant parasite outdoors under tropical or sub-tropical conditions may lower the costs for climate control, but shipping costs make this possibility less attractive. Besides, most countries or regions have restrictions against the import of rooted plants with soil, due to the risk of spreading plant pathogens.

Consequently, the price of such plants is very high and there is a need in the field to provide cost effective methods for producing plants with established plant parasites to be used as pot plants, ornamental plants and for production of plant parasite biomass for pharmaceutical purposes.

SUMMARY OF THE INVENTION

In a first aspect the invention relates to a method for preparation of a plant comprising in successive order establishing at least one plant parasite on at least one branch of a host plant, cutting at least one branch with at least one established plant parasite, and rooting the at least one cut branch.

Preferably, the invention relates to host plants for which commercially feasible methods for propagation via cuttings are available or can be developed.

In a number of investigated cases it turns out that the cuttings are capable of rooting with substantially the same rooting percentages as cuttings without plant parasites despite the presence of the parasites. This is unexpected due to the presence of the plant parasite.

Furthermore, several advantages are obtained by the inventive method.

Many plant parasites may be established on the same motherplant. Thereby less space is taken up by the method compared to prior art methods. Furthermore, large and strong mother plants can be used as hosts for the parasites. Large plants can more easily tolerate the presence of the parasites and can better support the growth of the parasites. After cutting the first series of cuttings from the motherplant, a new series of plant parasites can be sown on the branches of the same motherplant to produce a new round of cuttings with plant parasites.

Another great advantage is that the host plant with the parasites can be grown outdoors in a climate zone suitable for the host plant, preferably in its natural distribution area. Cuttings carrying the established plant parasite can then be shipped to the climate zone where the plants are to be sold ultimately. Cuttings can normally be imported without any quarantine restrictions. In the climate zone, where the plants are to be sold the cuttings can be rooted and grown until ready for sale. Thereby the time necessary in greenhouse can be considerably shortened.

According to another aspect, the invention relates to a method for preparation of a plant comprising in successive order establishing at least one plant parasite on a first host plant, cutting at least one piece of the first host plant with the at least one established plant parasite, and
grafting the at least one cut piece on a second host plant using tip-budding.

One advantage of this aspect of the invention is that the production time can be reduced. Preferably the plant parasites are established on relatively large and healthy host plants, on which the parasites can grow to a considerable size. As soon as the graft union is successful the plant is ready for sale.

According to a further aspect the invention relates to a rootable cutting of a host plant comprising at least one established plant parasite. Some of the advantages of the rootable cutting have been mentioned above. A rootable cutting with at least one plant parasite can easily and relatively rapidly be rooted and grown to a size suitable for sale.

When making the cutting, due care can be taken to the appearance of the finished garden- or pot plant product. For example, the cutting can be made so that the parasite is located in the lower or upper portion of the sales-plant. The parasite can be located on the main stem or on a side branch of the cutting. Furthermore, the cutting can be cut above the place of the plant parasite to produce a plant with more side branches. In other applications, it may be of interest to select a position for the plant parasite, which makes it easy to harvest the plant parasite either for biomass production or for production of cut-greens in plantations.

According to a further aspect the invention relates to a method for manufacturing a pharmaceutical composition comprising producing a plant according to the method disclosed above, growing the plants, harvesting plant parasite biomass, and producing a pharmaceutical composition from the plant parasite biomass.

By combining the inventive plant propagation method with growing of plant parasite biomass, the costs associated with this production can be lowered. When the plant parasites are established on the host plant and when the cuttings are cut, due care can be taken to the placement of the plant parasite on the plant to be grown in the field, so that the parasite is grown in a height, from which it is readily harvestable by hand or machine.

Definitions

Plant Parasite

Parasitic plants are here defined as vascular plants which have developed specialised organs for the penetration of the tissues of other vascular plants (hosts), and the establishment of connections to the vascular strands of the host to the end of absorption of nutrients by the parasite. These organs (albeit of different morphological nature in different parasitic plants) are termed haustoria. Most known parasitic plants thus defined belong to the dicotyledons.

Among parasitic plants commonly a distinction is made between holoparasites (lacking chlorophyll and photosynthesis, absorbing organic matter from the hosts) and hemiparasites (green, photosynthesising, absorbing mainly inorganic nutrients from the hosts). The borders are, however, not entirely clear, and several representatives of holoparasitic groups have been demonstrated to contain at least traces of chlorophyll.

According to an especially preferred embodiment of the invention, the plant parasite is a hemi-parasite. Examples of hemiparasites useful according to the present invention include, but are not limited to those belonging to the genera listed in Example 2.

Holo-parasites: a list of genera with primarily holo-parasites is disclosed in Example 3 of the present application.

Establishing a plant parasite: By the term establishing a plant parasite on a host plant is normally meant at least the process of germination of a seed or seeds on the host plant. The term establishing may also include the infection of the host plant by the plant parasite and the subsequent emerging of the plant parasite from the host.

For most plant parasites, seed germination is the natural way of plant development. Most plant parasites cultivate the superterraneous parts of the host plant, e.g. the branches, but some cultivate the sub-terraneous parts of the host plant, e.g. the roots.

For mistletoes, the establishment on the host plant can be divided into two distinct phases. During the first phase, the embryo axis elongates and the mistletoe develops a holdfast, which secures the mistletoe to the host plant. The first phase is non-parasitic.

During the next phase, the parasitic phase, the mistletoe cultivates the interior of the host plant by forming a complex haustorial or endophytic system consisting of haustoria and cortical strands. At a certain point during the parasitic phase, the parasite emerges from the interior of the host plant. The emergence may take place in a place different from the place of sowing, since the mistletoe may have grown a distance of several cm, such as up to 10–15 cm within the plant before it emerges.

Rooting a cut branch. The term refers to the process of rooting cuttings, which is well known to the skilled practitioner within the field of production of pot plants and ornamental plants.

Desired placement of the parasite on the cutting refers to the art of designing a finished plant product with the desired placement of the parasite. When making plants for ornamental purposes (pot plants and ornamentals) it is normally desired that the parasite is clearly visible. This may be done by taking into consideration the height above ground, distance from the shoot apex, the presence of shoots. When making plants for parasite-biomass production due regard must be taken to the later harvesting process. The height above ground is normally the decisive factor.

DETAILED DESCRIPTION

In the following further details of the invention are described with reference to the drawings in which.

Cuttings with Parasites

Figure 1:
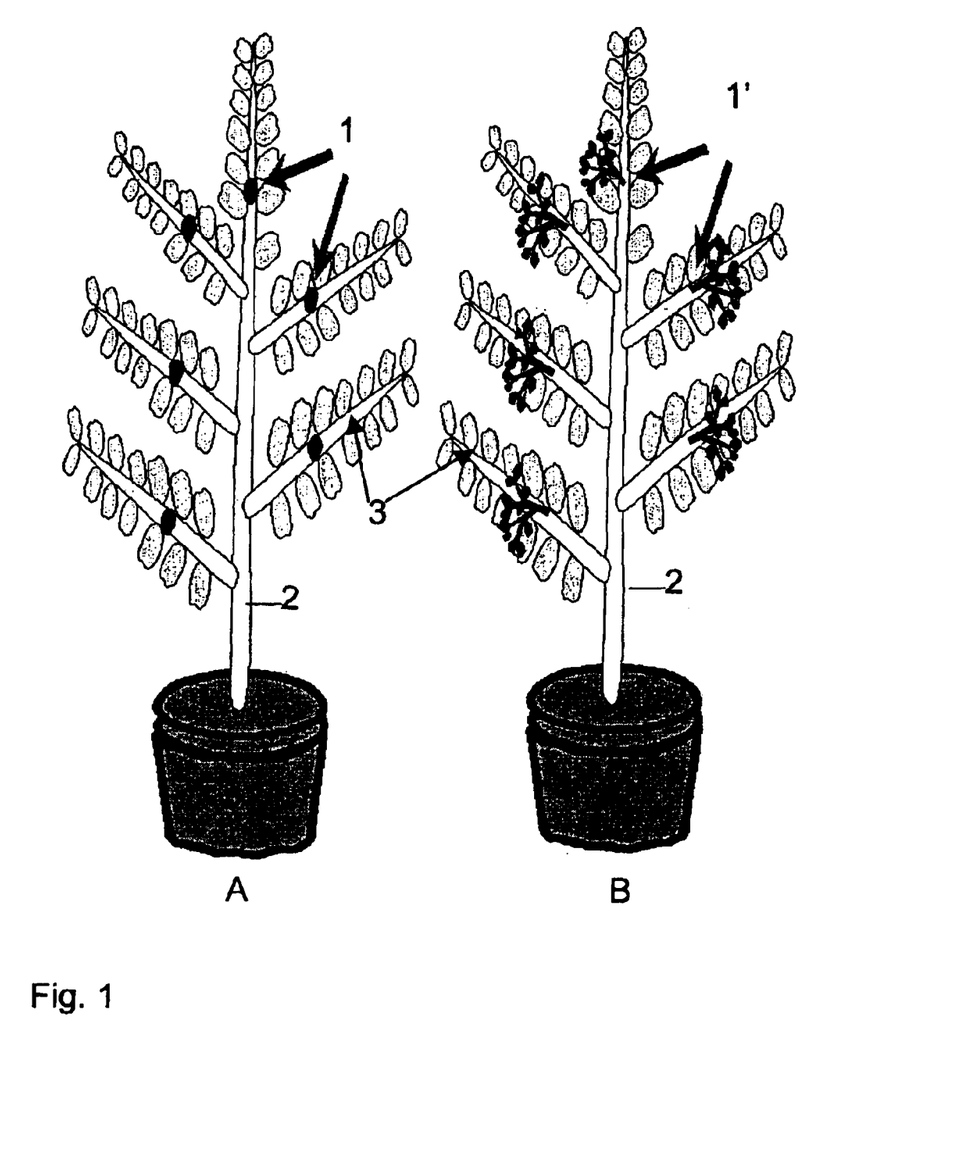
FIG. 1 shows a schematic illustration of the process of sowing mistletoe seeds on a host plant (A) and the emergence of mistletoes on the host (B).
Figure 2:
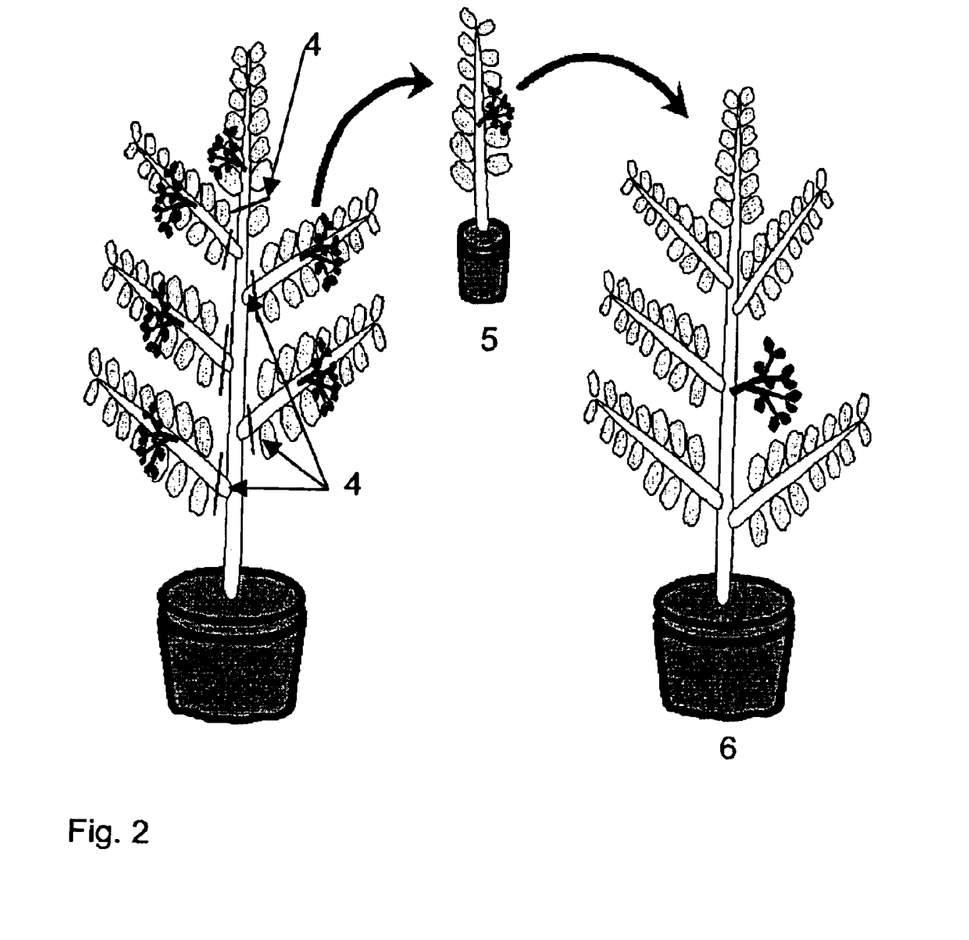
FIG. 2 schematically shows the process of cutting the branches with the established plant parasite, rooting the cutting, and growing the cutting to a plant ready for sale.

According to an especially preferred embodiment of the invention, the propagation is done via cuttings. This process is illustrated in FIG. 1 and FIG. 2. FIG. 1A shows, schematically, a motherplant (2), preferably with a lot of side branches. In the illustrated case, parasite seeds (1) have been placed on each of the branches (3), although this may also be done on a smaller number of branches. Similarly, there may be more than one parasite seed placed on each branch. In FIG. 1B the same plant (2) is shown at a later stage of development, when the seeds have germinated and formed established parasites (1').

In the left hand side of FIG. 2 a series of lines (4) are shown to indicate the positions of the cuts made to release the cuttings from the motherplant. Branches with cuttings are then rooted (5) and grown into a mature plant (6) ready for sale.

Grafting with Parasites

According to a separate embodiment, the invention relates to a method for preparation of a plant comprising in successive order establishing at least one plant parasite on a first host plant, cutting at least one piece of the first host plant with the at least one established plant parasite, and grafting the at least one cut piece on a second host plant using tip-budding or similar types of grafting.

By using this special embodiment for propagation of plants with plant parasites, the production time can be reduced. Preferably, the plant parasites are established on relatively large and healthy host plants, on which the parasites can grow to a considerable size. As soon as the graft union is successful, the plant is ready for sale.

When cutting the graft from the first host plant, it is important to have essentially all the haustorial or endophytic system of the parasite in the piece cut from the first host plant. Otherwise the plant parasite will not survive the grafting. Similarly, the size of graft taken from the first host plant should be of a substantial size compared to the size of the plant parasite growing on the graft in order to ensure survival of the graft until it has become united with the tissues in the second host plant.

Figure 3:
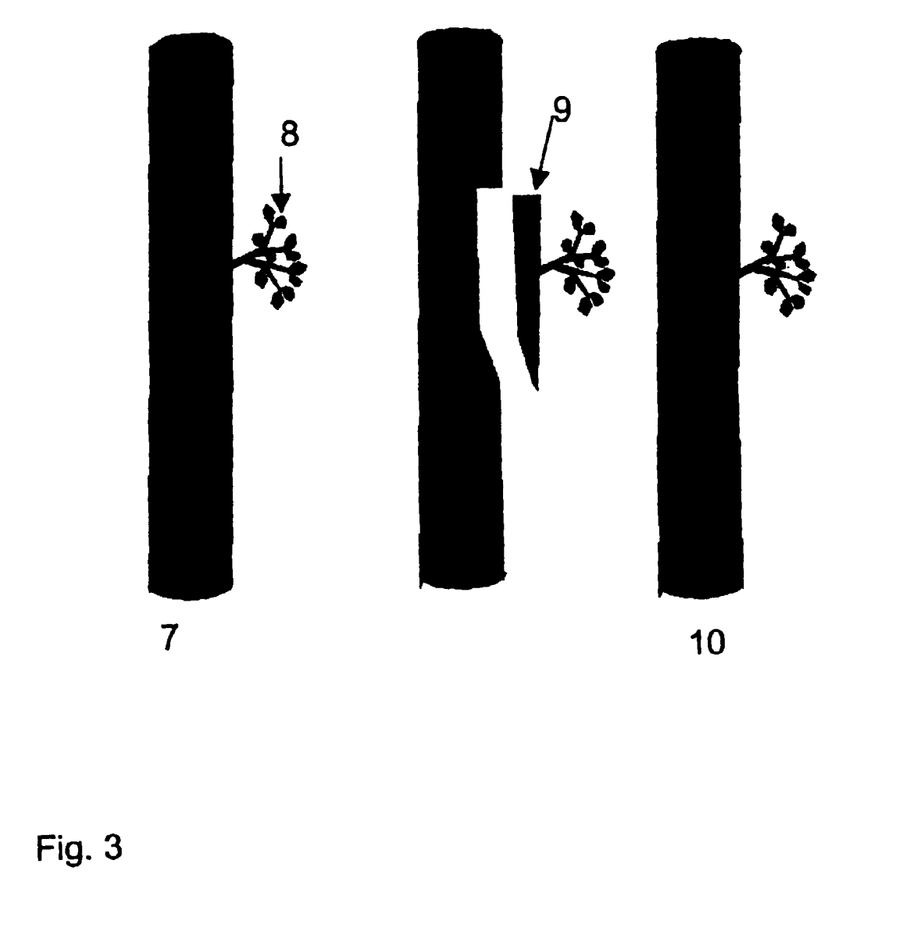
FIG. 3 shows the process of tip-budding of a piece of a mother host plant with an established plant parasite onto another host plant.

Preferably grafting is performed by tip-budding. The process of tip budding is illustrated in FIG. 3. After establishing the plant parasite (8) on the first host plant (7), a small graft (9) such as a piece of the stem with an established plant parasite is taken from the first host plant (7) and inserted into the stem or a branch of the second host plant (10). After union of the graft and scion, the plant is ready for sale.

Establishment of Plant Parasite

The vast majority of plant parasites reproduce via seeds. Propagation via seeds is also the preferred method for establishment of plant parasites according to the present invention. This most often amounts to placing a seed of the plant parasite on a place on the host plant, where it can germinate and infect the host plant. For some plant parasites, it may be possible through in vitro culture to produce artificial seeds, which can be placed on the host plant for conversion into a seedling (sometimes referred to as an embling), which may in turn infect the host plant.

The choice of place in which to place the seed depends largely on two factors. Firstly, the seed should preferably be placed in a position on the host plant, where it can easily infect the plant. As a general rule, infection is performed more easily in the herbaceous parts of the plants, but in many species, infection can also easily be carried out in the lignified parts of the plant. In some cases, a better infection can be obtained when the bark or the periderm is thinned prior to placing the seed on the surface of the plant. Normally, it is not beneficial to actually wound the host plant.

Seed germination is the natural way of infection for most plant parasites that can be used in the method of the present invention. Most of the parasite seeds have mechanisms that assist in their attachment to the host plant. Mistletoes thus have in their seed a viscid layer containing the protein viscin, which acts as a glue and attaches the seed to the host plant during germination. Attachment may be improved by slightly pressing the seeds against the host plant in order to squeeze out part of the viscin. Other ways of attaching the seeds to the host plant include use of other artificial or natural glues, or attachment using a layer, which allows air and light to penetrate. One example of such a layer is gauze.

Another important factor to consider when placing the seed on the host plant is the appearance of the cutting with the plant parasite. In principle the seed from the plant parasite can be placed anywhere on the host plant between the soil surface and a shoot apex. However normally, one would not want the plant parasite too close to the soil surface of a pot plant, therefore, preferably one should ensure that there is enough length of shoot below the place, where the plant parasite seed is placed, to give a final plant with the plant parasite a distance above ground. During the period of establishment of the plant parasite on the host plant, the host plant continues growth so that at the point of time, when the cutting is to be cut, there may be a substantial length of shoot above the plant parasite. This piece of host plant may be removed prior to or after rooting of the cutting to reduce the size of the final plant.

In order to obtain the full advantage of the present invention, the number of plant parasites established on the same host plant should be large taking into consideration the load of parasites that the host plant can tolerate. Thus preferably, at least 2 plant parasites are established on the same host plant. More preferably at least 3 plant parasites are established on the same host plant, such as at least 4 plant parasites, for example at least 5 plant parasites, such as at least 6 plant parasites, for example at least 7 plant parasites, such as at least 8 plant parasites, for example at least 9 plant parasites, such as at least 10 plant parasites, for example at least 15 plant parasites, such as at least 20 plant parasites, for example at least 25 plant parasites, such as at least 50 plant parasites, for example at least 75 plant parasites, such as at least 100 plant parasites. The upper limit is defined by the size of the host plant, i.e. primarily the number of shoots available for establishment of the plant parasites and its vigour, which determines how many plant parasites it can carry.

Under special circumstances it may be advantageous to place at least 2 different species or varieties of plant parasite on the same shoot of a host plant if compatibility allows so. Thereby plants with two or more different plant parasites can be produced.

Combination of Plant Parasite and Host Plant

Another factor of importance apart from compatibility, when selecting the combination of plant parasite and host plant for pot plants and ornamental plants is the appearance of the final plant with the parasite. For such plants it is important that the plant parasite presents itself and is clearly visible. Thus it is advantageous to select a plant parasite and a host plant to have a visibly different colour. This may for example be obtained when one of the two is of a variegata type or when one is dark green and the other is more pale. Another way of improving the way the plant parasite presents itself on the host plant is by selecting a plant parasite and a host plant that have a visibly different morphology, such as growth habit and/or leaf shape.

Growing the Host Plant

The host plant should be given optimal growing conditions during the establishment of the plant parasite until the cuttings are made. Thereby, optimal growing conditions for the parasites is also obtained.

The host plant may be grown in a green house during establishment of the plant parasite. Preferably, however the host plant is grown outdoors in a climate zone, which corresponds to the climate zone of its natural distribution. By growing the host plant outdoors under optimal climate conditions, costs can be saved and additionally the vigour of the host plant and the plant parasite is improved compared to growing under green-house conditions in another climate zone, for example a temperate climate zone.

Timing of Cutting

The cutting may be cut at almost any time after establishment of the plant parasite on the host plant. Important is that both the cutting and the plant parasite are capable of surviving until the cutting has rooted.

For most host/parasite combinations, the branch with the parasite is preferably cut when the plant parasite has emerged from the host plant. At this stage, the plant parasite is well established in the host plant and both parties can more easily survive cutting and rooting.

However, for some combinations it may be advantageous to cut the branch with the parasite just before the plant parasite reaches the parasitic phase. At this point the cutting is not affected by the presence of the plant parasite.

For some combinations and uses it may be advantageous to allow the parasite to grow to a large size such as 3–20 cm before cutting the branch to reduce the production time in the greenhouse to a minimum. Thus, according to some embodiments of the invention, the length of the parasite before cutting may be smaller than 1 cm, from 1 to 2 cm, 2–3 cm, 3–4 cm, 5–6 cm, 6–7 cm, 7–8 cm, 8–9 cm, 9–10 cm, 10–11 cm, 11–12 cm 12–13 cm, 13–14 cm, 14–15 cm, 15–16 cm, 16–17 cm 17–18 cm, 18–20 cm, 20–22 cm, 22–24 cm, 24–26 cm, 26–28 cm, 28–30 cm, or larger.

The choice of timing depends on the physiological state of the motherplant and parasite, the capability of the motherplant to root from large or old cuttings, and the growth rate of the parasite and/or the rooted cutting, and the ratio of the growth rate of the two members of the host/parasite combination.

Parasites

Although in its broadest sense the invention relates to any kind of plant parasite, according to an especially preferred embodiment, the plant parasite is a hemi-parasite. A number of the holoparasites are active saprophytes and degrade the host plant. Furthermore, the hemi-parasites are more suitable for ornamental plants and pot plants due to their green colour.

More preferably the plant parasite is a mistletoe. Mistletoes are well known by the consumers and there is a large demand for plants with this specific group of hemi-parasites. The number of plant genera with mistletoes depends on the eye of the taxonomist, but some generalisations can be made. There is somewhat of a consensus on the families Viscaceae (with 7 genera), Eremolepidaceae (3 valid genera), and Misodendraceae (with 1 genus, Misodendron). For the Loranthaceae, however, it is a much different story. Engler (1894) listed ten genera, but the number of genera now accepted varies from 50 to 70, depending on the treatment. Hundreds of species which were originally described in the genus "Loranthus L." (except for L. europaeus Jacq.) have now been assigned to other genera. The lists in Example 2 show that for the Loranthaceae about 15 genera are currently recognized in the New World and 50 in the Old World.

Among the mistletoes, the following are especially preferred: Viscum crasulae, V. engleri, V. rotundifolia, V. album, V. capense, V. minimum because many of their hosts can be easily rooted and because they have a typical "mistletoe morphology".

Other parasites according to the invention include Cuscuta spp, which may infect several woody species and also Pelargonium. Further examples of preferred plant parasites include but are not limited to Tapinanthus leedertziae, Tapinanthus olefolius, Tapinanthus kraussianus, Moquinella rubra. Another plant parasite is Thysanotus multiflorus.

Host Plant

The preferred host plants can be placed in three groups. Pot plants, ornamental plants (for gardens) and host plants suitable for production of plant parasite biomass. Among these the pot plants are especially preferred, because the demand is greatest for this group of plants. Furthermore, most pot plants are propagated by cuttings today, so that this step does not present any great problems for most host species.

Among the pot plant species the following may be mentioned as illustrative rather than limiting examples: Croton spp, *Euphorbia drupifera*, Euphorbia spp, *Euphorbia bubalina, E. canariensis, E. candelabrum, E. cotinifolia, E. ingens, E. leuconeura* (syn. *E. fournieri*), *E. lophogona, E. milii* (Syn *E. splendens*), *E. punicea, E. tirucalli, E. trigona, E. undulatifolia*, Jatroba spp, *Portulacria afra* (folia var.), Pelargonia spp., Ficus spp, Citrus spp, Aloe spp, Cotyledon spp.

The ornamental plants may comprise any ornamental species which is used for gardening, and for which methods for propagation by cuttings exist. These species may include Malus spp, Crataegus spp, Rosa spp., Betula spp, Sorbus spp, Olea spp, Nerium spp, Salix spp, Populus spp.

It is envisaged that species like, Salix spp, Populus spp, Eucalyptus spp, and certain Pinus spp, primarily *P. radiata*, may be used as host plants for mass production of plant parasite biomass. An advantage of using the present method for production of plants with plant parasites for plant parasite biomass is that uniform plants can be produced with the parasite located in a uniform height from which it can easily be harvested. This may also be an advantage, when plants with plant parasites are grown for producing cut-green or cut-greens.

Examples of preferred combinations of host and parasite are shown in this application.

Cutting

The invention also relates to the intermediate product defined as a rootable cutting of a host plant comprising an established plant parasite.

This cutting may be lignified or herbaceous according to the type of plant and the timing of removal of the cutting from the motherplant.

The plant parasite may be placed on the stem or on a shoot or a side branch of the cutting.

As described above the cutting may be removed from the motherplant at a stage when the plant parasite is in the parasitic stage, such as when the plant parasite has emerged from the host plant, or the cutting may be removed at a stage when the plant parasite is in the non-parasitic stage.

The cutting can be rooted according to known methods which may comprise the use of a plant growth regulator, such as an auxin selected from the group comprising IAA, IBA, 2,4 D, and NAA. In many cases, rooting of the cutting can be done without any exogenous plant growth regulators.

Production of Salix Cuttings and Salix Plants with Mistletoes or other Parasitic Plants Salix (SALICACEAE) is a large genus of trees or shrubs with more than 1000 known species many of which are grown as ornamental garden plants.

Production plan for Salix cuttings and Salix plants with mistletoes or other parasitic plants (FIG. 4):

Year 1, mother- or host-plants of Salix spp. are planted in the field (the plants are preferably planted while leafless i.e. in late autumn, winter or early spring). Year 2, or after one or more growth seasons, the mother- or host-plants are cut down to 5–60 cm above ground level.

Figure 4:
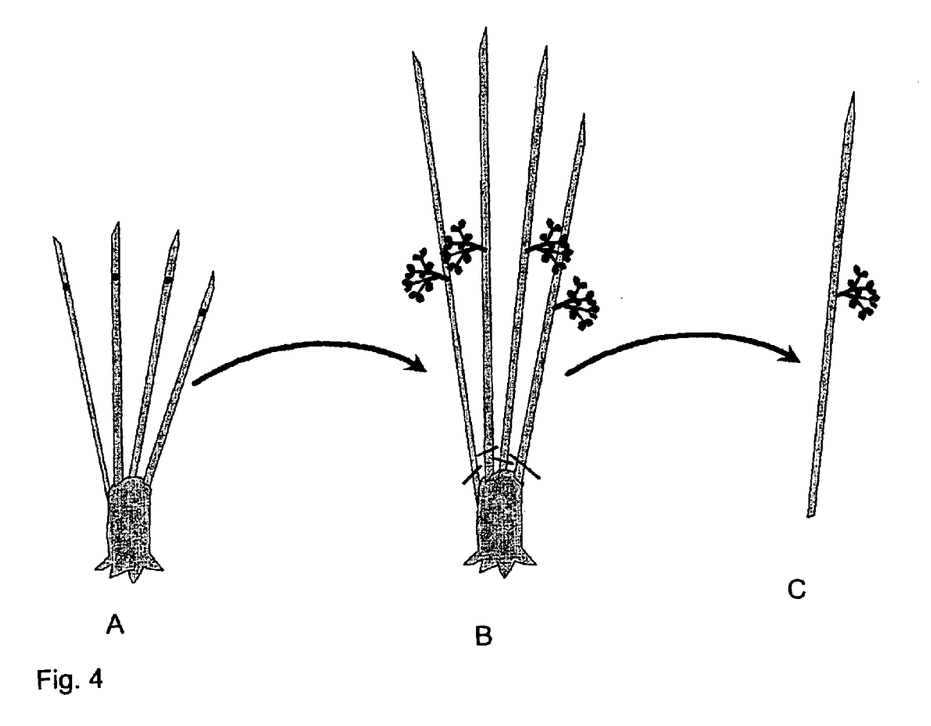
FIG. 4 shows the establishment of mistletoe on a Salix spp mother plant grown outdoors A, excision of cuttings with established mistletoes B and cuttings ready for shipment or rooting C.

Year 3–4, the mother- or host-plants form numerous vertical shoots (FIG. 4A) on which seeds of parasites which could be: *Moquinella rubra, Tapinanthus kraussianus, Viscum album, Viscum rotundifolium*, Viscum spp., Moquinella spp. or Tapinanthus spp. are sown (FIG. 4A).

Year 4–5 or 6 or 7 or 8 or 9 or 10, the parasites germinate and cultivate the interior of the mother- or host-plant, the parasite plants then emerges from the host plant to form their aerial shoot system (FIG. 4B).

Year 5 or 6 or 7 or 8 or 9 or 10 or 11, the shoots with established parasites are cut from the mother- or host-plant (FIGS. 4B and C). The mother- or host-plants can be left in the field to produce a new set of shoots which again can be seeded with parasites.

This production plan also applies to other host/parasite combinations such as the preferred combinations disclosed below:

| Parasite(s) | | Host(s) |
| --- | --- | --- |
| Viscum crasulae or Viscum spp. | on | Portulacaria afra, or Euphobia spp. |
| Viscum engleri or Viscum spp. | on | Ficus spp. or Citrus spp. |
| Tapinanthus leedertziae or Tapinanthus spp. | on | Croton spp. or Ficus spp. |
| Tapinanthus olefolius or Tapinanthus spp. | on | Aloe spp. or Cotyledon spp. or Euphorbia spp. or Ficus spp. |
| Tapinanthus kraussianus or Tapinanthus spp. | on | Ficus spp. |
| Moquinella rubra or Moquinella spp | on | Ficus spp. |
| Viscum capense or Viscum spp. | on | Euphorbia spp. |
| Viscum minimum or Viscum spp. | on | Euphorbia spp. |

Or any other host/parasite combination.

Figure 5:
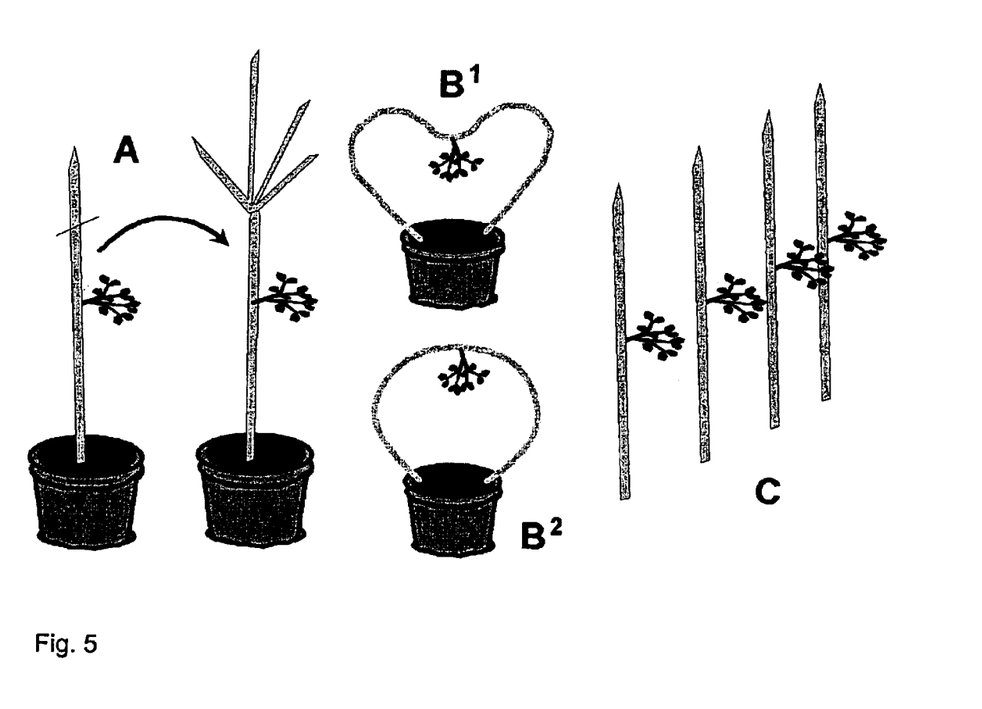
FIG. 5 shows the use of cuttings for A) establishment of trees; B) establishment of Salix pot plants including plants on hoops; C) a row-culture of Salix spp with mistletoes planted for production of mistletoe biomass.

Use of Salix cuttings with parasites (FIG. 5):

Cuttings of Salix, or any other plant genus, with established parasites can be rooted and cut back to form ornamental pot- or gardenplants (FIG. 5A).

Cuttings of Salix with established parasites can be rooted at both ends and grown as ornamental pot- or gardenplants the plant being it's own hoop (FIGS. $5B^1$ and $B^2$) if the cutting is winded with metal wire it may be bent in any desired shape as e.g. a heart shape (FIG. $5B^1$).

Cuttings of Salix, or any other plant genus, with established parasites can be planted in row-culture in the field for production of biomass from the parasites or for production of cut-greens from the parasites (FIG. 5C).

Pharmaceutical Use of Mistletoes

Mistletoe extracts have been therapeutically used for centuries. Since the beginning of this century, mistletoe preparations have been used in cancer therapy with varying success. It has been shown that the therapeutic effects are mediated in particular by socalled mistletoe lectins (viscumins, Viscum album agglutinins, VAA). Besides a cytotoxic effect today the art in particular discusses (unspecific) immunostimulation, the positive effects of which are used for the accompanying therapy and after-care of tumor patients. An increase in quality of life is possibly mediated in such patients by the secretion of endogeneous endorphins. Numerous in vitro and in vivo studies as well as clinical studies report an increased release of inflammatory cytokines (TNF-α, IL-1, IL-6) as well as an activation of cellular components of the immunological system ($T_H$ cells, NK cells).

Today a 60 kDa mistletoe lectin protein is considered the active principle of the mistletoe extracts which can be biochemically obtained from extracts. The ML protein consists of two covalently S—S linked subunits, the A chain of which being responsible for the enzymatic inactivation of ribosomes and its B chain being responsible for carbohydrate binding. Biological activity today is mainly attributed to the lectin activity of the B chain.

Beginning in the early 1900's, mistletoe and the pharmacological properties of extracts from mistletoe have been subjected to a more rigorous scientific investigation. In particular, mistletoe extracts have been suggested for use in treating a variety of specific diseases including cardiovascular illnesses, especially hypertension and arteriosclerosis; cancer and arthrosis. Fermented mistletoe extracts marketed under the tradenames ISCADOR®, HELIXOR® and PLENOSOL® have been proposed for use in treating a number of specific diseases. ISCADOR® and HELIXOR® have been injected subcutaneously while PLENOSOL® has been administered both intracutaneously and intravenously. These three commercially available preparations are derived from mistletoe found in Europe, Viscum album L.

Since 1980, the investigation of mistletoe has increased due to its immunomodulatory properties and potential usefulness in treating cancer. See International Journal of Cancer Research Treatment-ONCOLOGY-Vol. 43, Supplement 1, 1986. A major problem facing mistletoe investigators involves the analysis, identification and standardisation of the pharmacologically active ingredients in mistletoe and extracts thereof. This problem is exacerbated by the fact that the numerous complex ingredients which are found in mistletoe extracts vary widely in type and amount depending upon the species of mistletoe, the location where the plant is grown, the time of year when the plant is harvested, the particular host tree, the extraction procedure used and a number of other factors.

The principal classes of ingredients in mistletoe which have been found to provide pharmacological activity include lectins, phenylpropans, viscotoxins, alkaloids, flavonoids, lignans, amines, phenyl carboxylic acids and polysaccharides. Although the types of pharmacologically important compounds which are generally present in mistletoe have been identified, investigators have not had a great deal of success with respect to standardising the multitude of available extracts to establish if one or more ingredients are responsible for the observed bioactivity and whether the ingredients act together or may be effective individually. The extremely diverse nature of mistletoe extracts and the inherent variability in extract compositions makes it difficult to use the extracts to conduct clinical investigations. Standardisation of the pharmaceutical agent is essential in order to produce meaningful clinical data. Further, identification and standardisation of the active ingredients in mistletoe extracts are also important in the routine treatment of patients. It is imperative that the mistletoe extract be of consistent and verifiable quality to insure that dosage levels and treatment protocols are effective.

As is apparent from the above, mistletoe and extracts prepared therefrom are potent pharmacological agents. Further examples of pharmacological use of mistletoe extracts are described in WO 02/40041, WO 01/60389, WO 00/59464, WO 99/40109, WO 98/29540, WO 98/13053, WO 97/24136, WO 97/11967, WO 97/01636, WO 96/32123, WO 96/32122, WO 96/32121, WO 96/00239, WO 87/05218, all of which are hereby incorporated by reference.

Extracts of Mistletoe

One possible method involves the step of first preparing a powder of mistletoe. The mistletoe powder is then extracted with an aqueous solution to form an aqueous extract. The powdered mistletoe or mistletoe residue may also be obtained by lyophilising a known volume of mistletoe extract/solution which is to be standardised. The concentration may be expressed as mg plant material/ml or assayed for protein contents and described as μg or mg protein per ml of the solution. A portion of the aqueous extract is analysed to determine the concentration in mg/ml of one or more proteins which bind to lactose, galactose, melibiose, N-acetyl-D-galactosamine or fucose. The proteins are also further segregated based on whether they are dependent on calcium ion for binding. The sugar-binding proteins may also be analysed to determine the concentration of protein which is required to inhibit growth of a selected cancerous cell line, such as the leukemia cell line-L1210. The final step in the method involves identifying the extract as being of pharmaceutical grade, i.e. either accepting or rejecting the extract for use in specified treatment protocols. The final step involves determining whether the extract has sugar-binding protein levels within certain concentration and/or activity limits. In effect, the extract must meet a required sugar-binding protein fingerprint in order to be identified as pharmaceutical grade for a particular treatment protocol.

Other suitable methods for obtaining pharmaceutical grade extracts from mistletoe are disclosed in: U.S. Pat. Nos.

6,379,714, 6,306,453, 6,106,867, 5,846,548, 5,780,037, 5,738,850, 5,565,200, 5,547,674, all of which are incorporated by reference.

EXAMPLE 1

Propagation of *Portulacaria afra* with *Viscum crasulae*.

Motherplants of Porculacaria afra were grown outdoors under subtropical conditions in the southern hemisphere. On plants approx 80 cm in height, 2 years of age seeds of Viscum crasulae were sown on the outer branches of the upper half of the motherplants, 15 branches were used per motherplant, the seeds were placed approx 5 cm from apex in November. After approximately one month, the seeds have germinated and start cultivating the interior of the host plant, Portulacaria afra.

In November of the following year, the mistletoes have emerged from the host plant. From the time of emergence, these mistletoes need to grow for another 1 to 1½ years on the motherplant to reach the optimum size of 3–4 cm and cuttings 15–20 cm, with 3–5 nodes above misteltoe can be taken from the motherplant. In order to obtain a more compact sales plant, it may be necessary to cut the branch above the mistletoe to shorten the plant and stimulate the growth of side shoots.

By collecting shoots in June/July the cuttings can root and grow to the size of a sales plant before Christmas.

The same protocol may be used for succulent Euphorbia plants (eg *E. trigona*, or *E. quadrangularis*) using Viscum crasulae as a parasite.

EXAMPLE 2

TABLE 1

More than 200 described mistletoe genera including those that seem to be generally accepted in modern taxonomic accounts and those (in parenthesis) that are generally regarded as synonyms.

| | |
|---|---|
| VISCACEAE Batsch | ILEOSTYLUS van Tieghem |
| (Allobium Miers = Phoradendron) | (Ischnanthus van Tieghem = Tapinanthus) |
| | (Iticania Rafinesque = Elytranthe) |
| ARCEUTHOBIUM M. Bieb. | (Kingella van Tieghem = Trithecanthera) |
| (Aspidixia Korthals = Viscum) | (Lichtensteinia Wendl. = Tapinanthus) |
| (Baratostachys Uphof = Phoradendron) | |
| | LAMPAS Danser |
| DENDROPHTHORA Eichler | (Lanthorus Presl = Helixanthera) |
| (Distichella van Tieghem = Dendrophthora) | |
| | LEPEOSTEGERES Blume |
| GINALLOA Korthals | |
| | LEPIDARIA van Tieghem |
| KORTHALSELLA van Tieghem | (Lepidella van Tieghem = Lepidaria) |
| | (Leucobotrys van Tieghem = Helixanthera) |
| NOTOTHIXOS Oliver | (Lichtensteinia Wendl. = Tapinanthus) |
| (Ozarthris Rafinesque = Dendrophthora) | (Locella van Tieghem = Taxillus) |
| | (Lonicera Gaertn. = Dendrophthoe) |
| PHORADENDRON Nuttall | |
| (Phoradendrum Urban = Phoradendron) | LORANTHUS Linn. |
| (Razoumofskya Hoffmann = Arceuthobium) | |
| (Spiciviscum Engelmann = Phoradendron) | LOXANTHERA Blume |
| VISCUM Linn. | LYSIANA van Tieghem |
| EREMOLEPIDACEAE van Tieghem ex Kuijt | MACROSOLEN Blume |
| | (Meiena Rafinesque = Dendrophthoe) |
| ANTIDAPHNE Poeppig & Endlicher | (Metula van Tieghem = Tapinanthus) |
| (Basicapus van Tieghem = Antidaphne) | |
| (Eremolepis Grisebach = Antidaphne) | MOQUINIELLA Balle |
| | (Moquinia Spreng. f. = Moquiniella) |
| EUBRACHION Hooker f. | |
| (Ixidium Eichler = Antidaphne) | MUELLERINA van Tieghem |
| | (Neamyza van Tieghem = Peraxilla) |
| LEPIDOCERAS Hooker f. | (Neophylum van Tieghem = Amyema) |
| (Myrtobium Miquel = Lepidoceras) | |
| (Stachyphyllum van Tieghem = Antidaphne) | NUYTSIA R. Br. |
| | (Odontella van Tieghem = Tapinanthus) |
| LORANTHACEAE D. Don | (Oedina van Tieghem = Dendrophthoe) |
| | (Oliverella van Tieghem = Tapinanthus) |
| NEW WORLD | |
| | ONCELLA van Tieghem |
| AETANTHUS Engler | (Oncocalyx van Tieghem = Tapinanthus) |
| (Allohemia Rafinesque = Oryctanthus) | |
| | PAPUANTHES Danser |
| CLADOCOLEA van Tieghem | |
| | PEDISTYLIS Wiens |
| DENDROPEMON (Blume) Reichenb. | |
| | PERAXILLA van Tieghem |
| DESMARIA van Tieghem | (Perella van Tieghem =Peraxilla) |
| (Desrousseauxia van Tieghem = Aetanthus) | (Phoenicanthemum Blume =Helixanthera) |
| | (Phragmanthera van Tieghem = |
| GAIADENDRON G. Don | Tapinanthus) |
| (Glutago Poiret = Oryctanthus) | (Phrygilanthus Eichler =Cecarria, |
| | Muellerinia) |
| IXOCACTUS Rizzini | (Phyllodesmis van Tieghem = Taxillus) |

TABLE 1-continued

More than 200 described mistletoe genera including those that seem to be generally accepted in modern taxonomic accounts and those (in parenthesis) that are generally regarded as synonyms.

LIGARIA van Tieghem
(Loxania van Tieghem = Cladocolea)
(Macrocalyx van Tieghem = Aetanthus)
MARACANTHUS Kuijt
(Metastachys van Tieghem = Tristerix)
NOTANTHERA (DC.) Don ORYCTANTHUS Eichler ORYCTINA van Tieghem
(Passowia Karsten = Phthirusa)

PHTHIRUSA Martius
(Phrygilanthus Eichler = Tristerix,
Notanthera, Tripodanthus)
(Psathyranthus Ule = Psittacanthus)

PSITTACANTHUS Martius
(Phyllostephanus van Tieghem = Aetanthus)
(Taguaria Rafinesque = Gaiadendron)

STRUTHANTHUS Martius

TRIPODANTHUS van Tieghem

TRISTERIX Martius
OLD WORLD
(Aciella van Tieghem = Amylotheca)
(Acrostachys van Tieghem =0 Helixanthera)
(Acrostephanus van Tieghem = Tapinanthus)

ACTINANTHELLA Balle
(Acranthemum van Tieghem = Tapinanthus)
(Agelanthus van Tieghem = Tapinanthus)

ALEPIS van Tieghem

AMYEMA van Tieghem

AMYLOTHECA van Tieghem
(Antriba Rafinesque = Scurrula)
(Arculus van Tieghem = Amylotheca)

ATKINSONIA F. Muell.
(Bakerella van Tieghem = Taxillus)

BARATHRANTHUS Miquel
(Beccarina van Tieghem = Trithecanthera)
(Benthamina van Tieghem = Amyema)
(Blumella van Tieghem = Elytranthe,
Macrosolen)

CECARRIA Barlow
(Candollina van Tieghem = Amyema)
(Chiridium van Tieghem = Helixanthera)
(Chorilepidella van Tieghem = Lepidaria)
(Chorilepis van Tieghem = Lepidaria)
(Choristega van Tieghem = Lepeostegeres)
(Choristegeres van Tieghem =
Lepeostegeres)
(Cichlanthus van Tieghem = Scurrula)
(Cleistoloranthus Merrill = Amyema)
(Coleobotrys van Tieghem = Helixanthera)
(Cyathiscus van Tieghem = Barathanthus)

CYNE Danser

DACTYLIOPHORA van Tieghem

DECAISNINA van Tieghem

DENDROPHTHOE Martius
(Dentimetula van Tieghem = Tapinanthus)

(Pilostogma van Tieghem = Amyema)

PLICOSEPALUS van Tieghem
(Rhizanthemum van Tieghem = Amyema)
RHIZOMONANTHES Danser
(Schimperina van Tieghem = Tapinanthus)
SCURRULA Linn.
(Septimetula van Tieghem = Tapinanthus)

SEPTULINA van Tieghem

SOGERIANTHE Danser
(Stegastrum van Tieghem = Lepeostegeres)
(Stemmatophyllum van Tieghem = Amyema)
(Stephaniscus van Tieghem = Tapinanthus)
(Strepsimela Rafinesque = Helixanthera)
(Sycophila Welw. ex van Tieghem =
Helixanthera)

TAPINANTHUS Blume

TAPINOSTEMMA van Tieghem

TAXILLUS van Tieghem

TETRADYAS Danser
(Thelecarpus van Tieghem = Tapinanthus)
TIEGHEMIA Balle

TOLYPANTHUS (Blume) Reichenb.
(Treubania van Tieghem = Amylotheca)
(Treubella van Tieghem = Amylotheca)

TRILEPIDEA van Tieghem

TRITHECANTHERA van Tieghem

TUPEIA Cham. & Sclecht.

VANWYKIA Wiens
(Xylochlamys Domin. = Amyema)

MISODENDRACEAE Agardh (?) =
MYZODENDRACEAE)

MISODENDRON Banks & Solander
(Mizodendron = Misodendron)

GENERA OF UNKNOWN STATUS
(Presumably most of these are synonyms in
Old World Loranthaceae)
Alveolina van Tieghem
Apodina van Tieghem
Arculus van Tieghem
Arthraxon van Tieghem
Aspidixia van Tieghem
Basicarpus van Tieghem
Behautia
Bifaria van Tieghem
Botryololoranthus
Chatinia van Tieghem
Danserella
Dipodophyllum van Tieghem
Disrtichella van Tieghem
Eichlerinia van Tieghem
Epicola
Furcilla van Tieghem
Furarium Rizzini
Glossidea van Tieghem
Hemiarthron van Tieghem
Heteranthus
Heterixia van Tieghem
Hookerella van Tieghem
Isocaulon van Tieghem
Loxania van Tieghem TABLE 1-continued More than 200 described mistletoe genera including those that seem to be generally
accepted in modern taxonomic accounts and those (in parenthesis) that are
generally regarded as synonyms.

| | |
|---|---|
| DICYMANTHES Danser | Lipotactes |
| | Macrocalyx van Tieghem |
| DIPLATIA van Tieghem | Martiella van Tieghem |
| | Meranthera van Tieghem |
| DISTRANTHES Danser | Merismia van Tieghem |
| (Dithecina van Tieghem = Helixanthera) | Nalloga van Tieghem |
| | Miquelina van Tieghem |
| ELYTRANTHE Blume | Ptychostylus van Tieghem |
| | Peristethium van Tieghem |
| EMELIANTHE Danser | Ptychostylus van Tieghem |
| (Englerina van Tieghem = Tapinanthus) | Remotina |
| | Siphanthemum van Tieghem |
| ERIANTHEMUM van Tieghem | Socratina |
| (Etubila Rafinesque = Dendrophthoe, | Solenocalyx van Tieghem |
| Scurrula) | Spragueanella |
| | Spyrostylis |
| GLOBIMETULA van Tieghem | Stachyphyllum van Tieghem |
| (Helicanthera Spreng. = Helixanthera) | Strothanthus |
| | Thaumasianthes |
| HELICANTHES Danser | Triarthron van Tieghem |
| (Helica Pers. = Helixanthera) | Ungula |
| | Velvetia van Tieghem |
| HELIXANTHERA Lour. | |
| HYPHEAR Danser | |

EXAMPLE 3

Examples of Genera with Parasitic Plants

Balanophoraceae (Balanophora 26, Chlamydophytum 1, Corynaea 2, Cynomorium 2, Dactylanthus 1, Ditepalanthus 1, Exorhopala 1, Hachettea 1, Helosis 2, Langsdorffia 3, Lathrophytum 1, Lophophytum 4, Mystropetalon 1, Ombrophytum 4, Rhopalocnemis 1, Sarcophyte 1, Scybalium 4, Thonningia 1)
Hydnoraceae (Hydnora 4, Prosopanche 3)
Lauraceae p.p. (Cassytha 29)
Lennoaceae (Lennoa 2, Pholisma 3)
Rafflesiaceae (Apodanthes 7, Bdallophyton 4, Berlinianche 2, Botryocytinus 1, Cytinus 9, Hypolepis 3, Mitrastema 2, Pilostyles 17, Rafflesia 13, Rhizanthes 2, Sapria 2)
Convolvulaceae p.p./Cuscutaceae (Cuscuta 279)
Scrophulariaceae-Gerardieae p.p. (Alectra 48, Harveya 41, Hyobanche 7, Striga 50)
Scrophulariaceae-Rhinatheae p.p. (Lathraea 6, Tozzia 2)
Orobanchaceae (Aeginetia 10, Boschniakia 1, Christisonia 18, Cistanche 24, Conopholis 3, Epifagus 1, Gleadovia 3, Kopsiopsis 2, Mannagettaea 2, Necranthus 1, Orobanche 130, Phacellanthus 1, Phelypaea 2, Platypholis 1, Xylanche 1)

What is claimed is:

1. A method for preparation of a plant comprising in successive order establishing at leant one plant parasite on at least one branch of a host plant, cutting at least one branch with at least one established plant parasite, and rooting the at least one cut branch.

2. The method according to claim 1, comprising germination of at least one seed from the parasite on the host plant.

3. The method according to claim 1, comprising conversion into a seedling of at least one artificial seed of the plant parasite on the host plant.

4. The method according to claim 1, whereby at least one plant parasite seed is placed on the host plant between a shoot apex and the soil surface.

5. The method according to claim, 4, whereby the at least one plant parasite seed is placed on a shoot or a side shoot.

6. The method according to claim 4, whereby the at least one plant parasite seed is placed on the host plant in a position that ensures infection of the host plant by the plant parasite, and said position of the plant parasite seed is at a location on the host plant that is desirable for use as a cutting, so that when the parasite is established, the cutting will have the plant parasite at a position so that the plant parasite is not in close proximity to the soil surface when the cutting is rooted.

7. The method according to claim 4, whereby the at least one seed is placed on a herbaceous part of the host plant.

8. The method according to claim 4, whereby the at least one seed is attached to the host plant by its own glue.

9. The method according to claim 4, whereby the at least one seed is attached to the host plant by artificial glue and/or light- and air- penetrable fastening means.

10. The method according to claim 4, whereby the periderm of the host plant is made thinner where the at least one seed is placed.

11. The method according to claim 1, whereby the host plant is grown in a green house during establishment of the plant parasite.

12. The method according to claim 1, whereby the host plant is grown outdoors.

13. The method according to claim 1, whereby the branch with the parasite is cut when the plant parasite has emerged from the host plant.

14. The method according to claim 1, whereby the branch with the parasite is cut just before the plant parasite reaches the parasitic phase.

15. The method according to claim 1, comprising establishment of at least 2 plant parasites on the same host plant.

16. The method according to claim 15, whereby the at least 2 plant parasites on the same host plant ate of at least 2 different species or varieties.

17. The method according to claim 1, whereby the parasite is a semi-parasite.

18. The method according to claim 17, whereby the parasite is a mistletoe.

19. The method according to claim 18, whereby the mistletoe is a species selected from species belonging to *Viscaceae, Eranolepidaceae, Misodendraceae,* or *Loranthaceae.*

20. The method according to claim 19, whereby the mistletoe is selected from the group consisting of *Viscum crasulae, V. engleri, V. rotundifolia, V. album, V. capense,* and *V. minimum.*

21. The method according to claim 17, whereby the hemi-parasite is selected from the group consisting of Cuacuta spp, *Cuscuta suropaea,* Tapinanthus spp, *Tapinanthus olefolius, T. leedertziae, T. kraussianus,* Moquinella spp, *M. rubra,* and *Thysanotus multiflorus.*

22. The method according to claim 1, whereby the host plant is a pot plant.

23. The method according to claim 22, whereby the host plant is selected from the group consisting of Croton spp, *Elaeophoria drupifera,* Euphorbia spp, *Eurphobia bubalina, E. canariensis, E. candelabrum, E. cotinifolia, E. ingens, E. leuconeura* (syn. *E. fournieri*), *E. lophogona, E. milii* (Syn *E. splendens*), *E. punicea, E. tirucalli, E. trigona* "High Chaparal", *E. undulatifolia,* Jatropha spp, Portulacaria afra (folia var.), Pelargonia spp., Ficus spp, Citrus spp., Aloe spp., Cotyledon spp.

24. The method according to claim 1, whereby the host plant is an ornamental plant used for gardening.

25. The method according to claim 24, whereby the host plant is selected from the group consisting of Malus spp, Crataegus spp, and Rosa spp.

26. The method according to claim 1, whereby the host plant is an agricultural plant.

27. The method according to claim 26, whereby the host plant is selected from the group consisting of Ecalyptus spp, Salix spp, Popolus spp, and Pinus spp.

28. A method for preparation of a plant comprising in successive order establishing at least one plant parasite on a first host plant, cutting at least one piece of the first host plant with the at least one established plant parasite, and grafting the at least one cut piece on a second host plant using tip-budding.

* * * * *

UNITED STATES PATENT AND TRADEMARK OFFICE
CERTIFICATE OF CORRECTION

PATENT NO. : 6,792,715 B2
DATED : September 21, 2004
INVENTOR(S) : Smidstrup Damgaard Pedersen et al.

It is certified that error appears in the above-identified patent and that said Letters Patent is hereby corrected as shown below:

Column 15,
Line 66, "leant" should be -- least --

Column 16,
Line 58, "ate" should be -- are --
Line 61, "semi" should be -- hemi --
Line 66, "Eranolepidaceae" should be -- Eremolepidaceae --

Column 17,
Lines 5-6, "cuacuta" should be -- cucucta --
Line 7, "suropaea" should be -- europaea --
Line 14, "Eurphobia" should be -- Euphorbia --
Line 17, "portulacaria" should be -- portulacria --

Signed and Sealed this

First Day of March, 2005

JON W. DUDAS
*Director of the United States Patent and Trademark Office*